United States Patent
Isono

(10) Patent No.: US 7,724,312 B2
(45) Date of Patent: May 25, 2010

(54) DRIVING CIRCUIT OF DISPLAY ELEMENT, IMAGE DISPLAY APPARATUS, AND TELEVISION APPARATUS

(75) Inventor: Aoji Isono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/131,234

(22) Filed: Jun. 2, 2008

(65) Prior Publication Data

US 2008/0239166 A1 Oct. 2, 2008

Related U.S. Application Data

(63) Continuation of application No. 11/167,182, filed on Jun. 28, 2005, now Pat. No. 7,411,632.

(30) Foreign Application Priority Data

Jun. 30, 2004 (JP) ............................ 2004-193928
Jun. 15, 2005 (JP) ............................ 2005-175118

(51) Int. Cl.
  *H04N 3/14* (2006.01)
  *G09G 3/34* (2006.01)
(52) U.S. Cl. .................. 348/792; 348/790; 348/800
(58) Field of Classification Search ......... 348/790–792, 348/751, 643–649, 650, 655, 674–675, 679, 348/800; 345/87–88, 151, 99–100, 94, 84, 345/98; *H04N 3/14; G09G 3/34*
See application file for complete search history.

(56) References Cited

U.S. PATENT DOCUMENTS

| 4,591,902 | A  | 5/1986  | Masubuchi ............... 358/59 |
| 4,942,458 | A  | 7/1990  | Miyajima et al. ......... 358/29 |
| 5,621,479 | A  | 4/1997  | Akiyama ................. 348/648 |
| 7,145,542 | B2 | 12/2006 | Kasai ..................... 345/98 |
| 2003/0174108 | A1 | 9/2003 | Kasai ..................... 345/87 |

FOREIGN PATENT DOCUMENTS

| CN | 1445743 A    | 10/2003 |
| JP | 2003-316312  | 11/2003 |

*Primary Examiner*—Trang U Tran
(74) *Attorney, Agent, or Firm*—Fitzpatrick, Cella, Harper & Scinto

(57) ABSTRACT

A driving circuit for display elements, comprises a modulation circuit that outputs a modulating signal to be applied to wiring to which display elements are connected; and an output circuit that serializes modulation data including height value data for determining a height value of at least part of waveform of the modulating signal and pulse width data for determining a pulse width of at least part of waveform of the modulating signal so that the modulation data can be transmitted to the modulation circuit by transmission paths, the number of which is smaller than the number of bits of the modulation data, and outputs the serialized modulation data.

8 Claims, 12 Drawing Sheets

DRIVING CIRCUIT OF DISPLAY ELEMENT, IMAGE DISPLAY APPARATUS, AND TELEVISION APPARATUS

This application is a continuation of application Ser. No. 11/167,182 filed Jun.28, 2005.

BACKGROUND OF THE INVENTION

1. Field of the Invention

The present invention relates to the driving circuit of a display element and, in particular, is suitably applied to a driving circuit for making a light emitting device emit light of brightness corresponding to gradation data.

2. Description of the Related Art

In Japanese Laid-Open Patent No. 2003-316312 (see FIG. 12) as a related art are described a driving method by which a driving circuit for driving a light emitting device by a stepwise driving waveform of a combination of pulse width modulation and amplitude modulation can be constructed with ease and at low cost, and the driving circuit thereof.

SUMMARY OF THE INVENTION

With an increase in the number of levels of gradation, the number of data lines to be transmitted will be increased. For this reason, it has been strongly desired to develop a technology capable of preventing an increase in the number of data lines even when the number of levels of gradation increases.

Therefore, the object of the invention is to provide a driving circuit capable of reducing the number of transmission paths and transmission lines.

One of inventions in accordance with the present application is an invention of a driving circuit constructed in the following manner.

That is, there is provided a driving circuit for display elements, comprising:

a modulation circuit that outputs a modulating signal to be applied to wiring to which display elements are connected; and an output circuit that serializes modulation data including height value data for determining a height value of at least part of waveform of the modulating signal and pulse width data for determining a pulse width of at least part of waveform of the modulating signal so that the modulation data can be transmitted to the modulation circuit by a transmission path(s), the number of which is smaller than the number of bits of the modulation data, and outputs the serialized modulation data.

According to this construction, it is possible to reduce the number of transmission paths.

According to this invention, there is provided a driving circuit, wherein the transmission paths are plural, and wherein the output circuit is constructed:

(i) in such a way as to output the serialized height value data to predetermined ones of the transmission paths without outputting the serialized pulse width data and to output the serialized pulse width data to other predetermined ones of the transmission paths without outputting the serialized height value data; and (ii) in such a way as to output an arbitrary data bit(s) during time during which any of data bits constructing the height value data and data bits constructing the pulse width data are not transmitted in at least either the predetermined ones of the transmission paths or the other predetermined ones of the transmission paths, the time during which any of the data bits constructing the height value data and the data bits constructing the pulse width data are not transmitted is time caused by mismatch between the number of bits of the height value data for generating one modulating signal and the number of bits of the pulse width data for generating the one modulating signal.

According to this construction, it is possible to enhance the degree of flexibility of setting data when the serializing of data is performed.

According to this invention, there is provided a driving circuit, wherein the transmission paths are plural, and wherein the output circuit is constructed:

(i) in such a way as to output the serialized height value data to predetermined ones of the transmission paths without outputting the serialized pulse width data and to output the serialized pulse width data to other predetermined ones of the transmission paths without outputting the serialized height value data; and (ii) in such a way as to output arbitrary data bit(s) during time during which data bits constructing the height value data are not transmitted in the predetermined ones of the transmission paths, the time during which the data bits constructing the height value data are not transmitted is time caused by mismatch between the number of bits of the height value data for generating one modulating signal and the number of bits of the pulse width data for generating the one modulating signal, the arbitrary data bit(s) is outputted in such a way as to be located at the same position(s) in an arrangement of the respective data bits constructing the plurality of height value data different in value from one another.

Or there is provided a driving circuit, wherein the transmission paths are plural, and wherein the output circuit is constructed:

(i) in such a way as to output the serialized height value data to predetermined ones of the transmission paths without outputting the serialized pulse width data and to output the serialized pulse width data to other predetermined ones of the transmission paths without outputting the serialized height value data; and (ii) in such a way as to output arbitrary data bit(s) during time during which data bits constructing the pulse width data are not transmitted in the other predetermined ones of the transmission paths, the time during which the data bits constructing the pulse width data are not transmitted is time caused by mismatch between the number of bits of the height value data for generating one modulating signal and the number of bits of the pulse width data for generating the one modulating signal, the arbitrary data bit(s) is outputted in such a way as to be located at the same position(s) in an arrangement of the respective data bits constructing the plurality of pulse width data different in value from one another.

According to these constructions, it is possible to reproduce desired data in the modulation circuit even when arbitrary bit(s) is inserted into the arrangement of data bits.

There is provided a driving circuit, wherein the transmission paths include at least a transmission path for transmitting both of at least part of data bits constructing the height value data and at least part of data bits constructing the pulse width data, and wherein the modulation circuit includes:

a memory circuit(s) for storing data bits transmitted via the transmission path; and a control circuit(s) that reads data bits constructing the height value data from the memory circuit(s) to output them as height value data and read data bits constructing the pulse width data from the memory circuits to output them as pulse width data.

Here, in the invention, when time during which data is not transmitted is produced by the serializing of the height value data and the pulse width data, as is the case with the above invention, it is possible to construct the invention in such a way as to output arbitrary data bit(s).

According to this construction, it is possible to serially transmit the data having different data attributes in mixture.

In particular, according to this construction, there is provided a driving circuit, wherein the memory circuit has a plurality of memory elements each storing a data bit to be inputted, the plurality of memory elements are connected in series, each memory element is constructed in such a way as to output the stored data bit to the next memory element connected in series in synchronization with a new data bit being inputted and to store the newly inputted data bit, part of the plurality of memory elements connected in series outputs data bits constructing the height value data, and other part of the plurality of memory elements outputs data bits constructing the pulse width data.

In this regard, in the respective inventions described above, it is possible to employ a construction in which the height value data is data for determining the height value of a portion where the modulating signal becomes a maximum height value or a construction in which the pulse width data is data for determining timing when the modulating signal falls.

Further, the present application includes an invention of an image display apparatus and this image display apparatus is constructed of the above-described driving circuit and a display device for displaying an image according to the modulating signal outputted from the driving circuit.

Still further, the present application includes an invention of a television apparatus and this television apparatus is constructed of the above-described image display apparatus and a receiving circuit that receives a television signal and supplies image data to the image display apparatus.

DETAILED DESCRIPTION OF THE PREFERRED EMBODIMENTS

Figure 1:
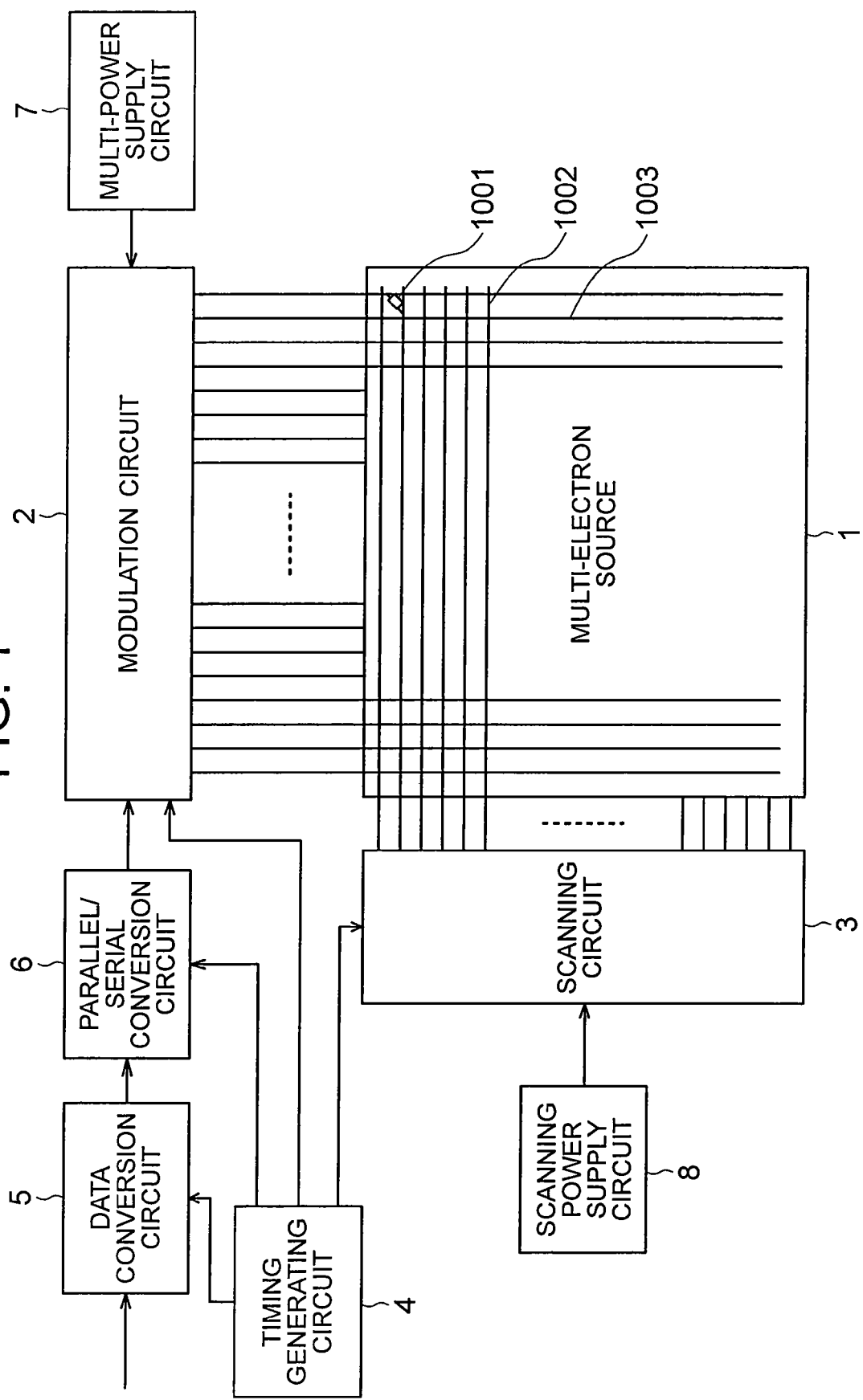
FIG. 1 is the block diagram of a driving circuit in accordance with a first embodiment of the present invention.

Hereafter, the preferred embodiments of this invention will be described in detail by way of examples with reference to the drawings. However, it is not intended to limit the scope of this invention only to the sizes, materials, shapes, and relative arrangements of the constituent parts described in these embodiments, unless otherwise specified. In this regard, the same or corresponding parts in all drawings of these embodiments to be described below are denoted by the same reference numerals.

Embodiment of Television Apparatus

Figure 12:
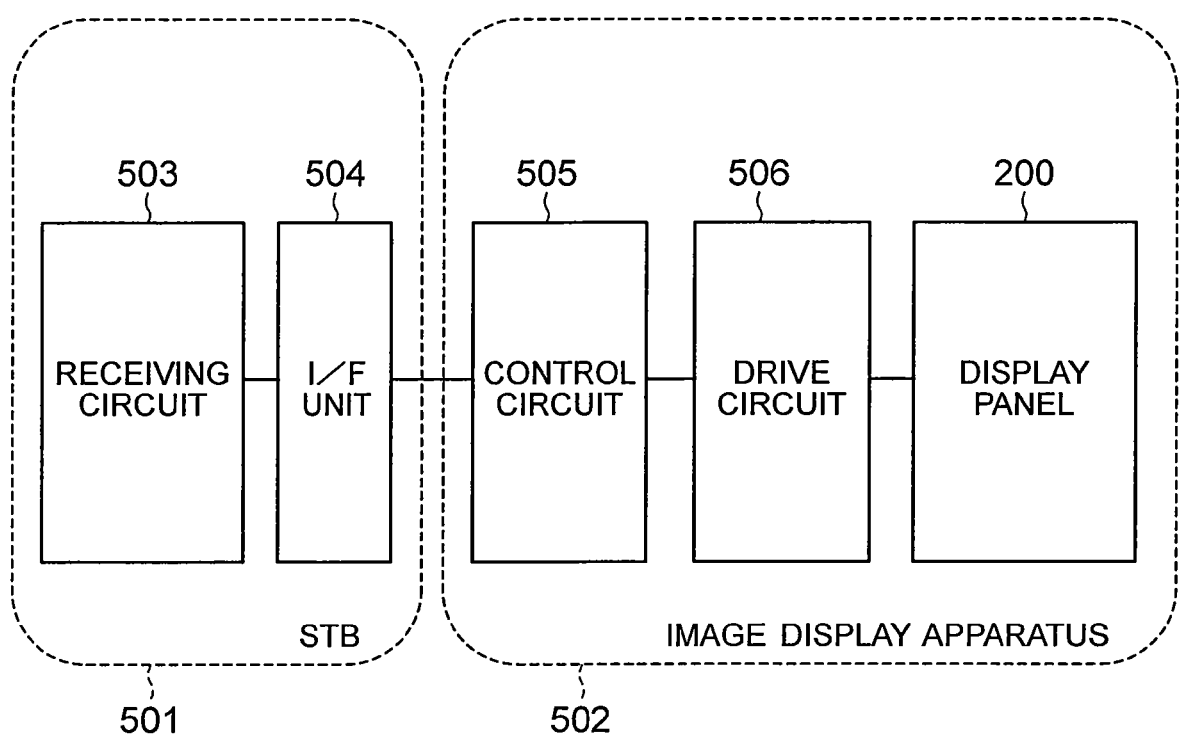
FIG. 12 is the block diagram of a television apparatus in accordance with the present invention.

First, a television apparatus to which the present invention can be applied will be described with reference to FIG. 12. FIG. 12 is a block diagram of a television apparatus in accordance with the present invention. The television apparatus is provided with a set top box (STB) 501 and an image display apparatus 502.

The set top box (STB) 501 includes a receiving circuit 503 and an I/F unit 504. The receiving circuit 503 includes a tuner, a decoder, and the like and receives the television signals of satellite broadcasting and terrestrial waves, data broadcasting via networks, and the like, and outputs decoded video data to the I/F unit 504. The I/F unit 504 converts the video data to the display format of the image display apparatus 502 and outputs the image data to the image display apparatus 502.

The image display apparatus 502 includes a display panel 200, a control circuit 505, and a driving circuit 506. The control circuit 505 included in the image display apparatus 502 performs image processing such as correction processing suitable for the display panel 200 to the inputted image data and outputs the image data and various kinds of control signals to the driving circuit 506. One example of the control circuit 505 is a timing generating circuit 4 in FIG. 1. The driving circuit 506 outputs a driving signal to the display panel 200 on the basis of the inputted image data, whereby a television image is displayed on the display panel 200. Examples of the driving circuit 506 are a modulation circuit 2 and a scanning circuit 3 in FIG. 1. One example of the display panel 200 is a multi-electron source 1, as shown in FIG. 1, in the following embodiment. As the multi-electron source 1 can be used various kinds of display panels, for example, FED, PDP, LCD display, LED, EL display, and the like.

In this regard, the receiving circuit 503 and the I/F unit 504 may be received as the set top box (STB) 501 in a box separate from the image display apparatus 502 or may be received in the same box as the image display apparatus 502.

First, the driving circuit of a display apparatus in accordance with the first embodiment of this invention will be described. In FIG. 1 is shown a driving circuit in accordance with this first embodiment.

As to a modulation method of a modulating signal, pulse width modulation of modulating the time width of the modulating signal and amplitude modulation of modulating the amplitude of the modulating signal can be employed. In the case of simple pulse width modulation, it is recommended that a pulse width be determined according to gradation data (which is data showing brightness to be displayed, for example, brightness data) with the amplitude of the modulating signal fixed. In this case, it is recommended that gradation data be inputted directly to a modulation circuit. Moreover, in the case of simple amplitude modulation, it is recommended that amplitude be determined according to gradation data with the pulse width of the modulating signal fixed. In this case, it is also recommended that the gradation data be inputted directly to the modulation circuit.

Meanwhile, the present inventor of this application studies a construction in which in place of the simple pulse width modulation or the simple amplitude modulation, both of the pulse width control and the amplitude control of the modulating signal are set on the basis of the gradation data. In this construction, a construction can be preferably employed in which in order to determine the waveform of pulse of a modulating signal, a modulation circuit includes: a height (crest) value setting circuit that is a circuit for determining at least part of height value (amplitude) of the modulating signal; and a timing setting circuit that is a circuit for determining a timing when the height value of at least part of the modulating signal is changed to another height value (including a reference level to be the reference of amplitude of the modulating signal (for example, ground level or the like). In this case, a construction can be preferably employed in which in place of inputting gradation data having a value of magnitude of one-to-one correspondence to brightness to be displayed directly to the modulation circuit, height value data that is data to be referred to set a height value by the height value setting circuit and timing data that is data to be referred to set a timing by the timing setting circuit are respectively generated (format conversion of gradation data is performed) and are then inputted to the modulation circuit.

In the embodiment to be described here, the most preferable embodiment when the height value data and the timing data are inputted to the modulation circuit will be described.

As shown in FIG. 1, a driving circuit in accordance with the first embodiment for driving a multi-electron source 1 is constructed to include a modulation circuit 2, a scanning circuit 3, a timing generating circuit 4, a data conversion circuit 5, a parallel/serial conversion circuit 6 as an output circuit, a multi-power supply circuit 7, and a scanning power supply circuit 8. This driving circuit constructs part of an image display section of an image display apparatus.

The multi-electron source 1 includes surface conduction electron-emitting devices 1001 as display elements. While the surface conduction electron-emitting devices are here used as display elements, various kinds of elements such as spindt type electron emission elements and electroluminescence elements can be used as the display elements. Here, when the electron emission elements such as the surface conduction electron-emitting devices are used as the display elements, a luminescent body is irradiated with electrons emitted by the electron emission elements to generate light. An image is displayed by this light. The brightness of the light can be controlled by the amount of irradiation of electrons within a predetermined time period from the electron emission element (in the embodiment described here, within one selection period of line sequential scanning). The amount of irradiation of electrons from the electron emission element can be controlled by the magnitude and time width of voltage applied to the electron emission element. Hence, a desired amount of irradiation of electrons can be obtained by controlling an electric potential difference between the electric potential of a scanning signal and the electric potential of a modulating signal and the application time of the modulating signal within a period during which the scanning signal is applied.

The multi-electron source 1 includes a plurality of scanning wirings 1002 and a plurality of modulating wirings 1003 which are connected to a plurality of display elements in such a way as to drive the display elements in a matrix. The scanning signals are applied to these scanning wirings 1002 and the modulating signals are applied to the modulating wirings 1003.

The modulation circuit 2 is connected to wirings in the direction of row that are the modulating wirings of the multi-electron source 1. PHM data that is the height value data and PWM data that is pulse width data (timing data), which have been described above, are inputted to this modulation circuit 2. The PHM data and the PWM data, which are serially converted by the parallel/serial conversion circuit 6 as an output circuit, are inputted to the modulation circuit 2. Each of the PHM data that is the height value data and the PWM data that is timing data is not data that is in one-to-one correspondence to brightness to be required but when the modulation circuit refers to both of them, it can generate a modulating signal for realizing the brightness to be required. Hence, it can be said that the PHM data of height value data and the PWM data of pulse width data, which are inputted as modulation data to the modulation circuit, are data for constructing gradation data corresponding to gradation to be required. The modulation circuit 2 is a circuit that generates a modulating signal according to the inputted modulation data. The modulation circuit 2 functions as modulation means for providing a modulating signal modulated on the basis of the modulation data inputted from the parallel/serial conversion circuit 6 to the wirings in the direction of row, which are connected to the plurality of electron sources.

The scanning circuit 3 is connected to the wirings in the direction of line of the multi-electron source 1 and is a circuit that supplies scanning wirings, to which display elements to be driven by the output of the modulation circuit 2 are connected, with a selection signal (scanning signal). In general, the line sequential scanning of selecting lines one by one sequentially is performed. However, scanning is not necessarily limited to the line sequential scanning but it is possible to perform skip scanning or to select a plurality of lines or to select lines by area. That is, the scanning circuit 3 functions as selection means that applies a selecting electric potential to wirings in the direction of line, to which the plurality of electron sources to be driven out of the plurality of electron sources included in the multi-electron source 1 are connected, for a predetermined time and applies a non-selecting electric potential to the wirings for the other time, thereby selecting lines.

The timing generating circuit 4 is a circuit that generates the timing signals of the respective circuits of the modulation circuit 2, the scanning circuit 3, the data conversion circuit 5, and the parallel/serial conversion circuit 6.

The data conversion circuit 5 is a circuit that performs the data conversion of converting the gradation data (brightness data) showing brightness, which is required of the multi-electron source 1 from the outside, to a driving waveform data format suitable for the modulation circuit 2.

The parallel/serial conversion circuit 6 is a circuit that converts the gradation data of parallel data, which is outputted from the data conversion circuit 5, to serial data for each of the PHM data and the PWM data. A data format inputted to this parallel/serial conversion circuit 6 and a data format outputted from the parallel/serial conversion circuit 6 will be described with reference to FIG. 2 and FIG. 4.

Figure 2:
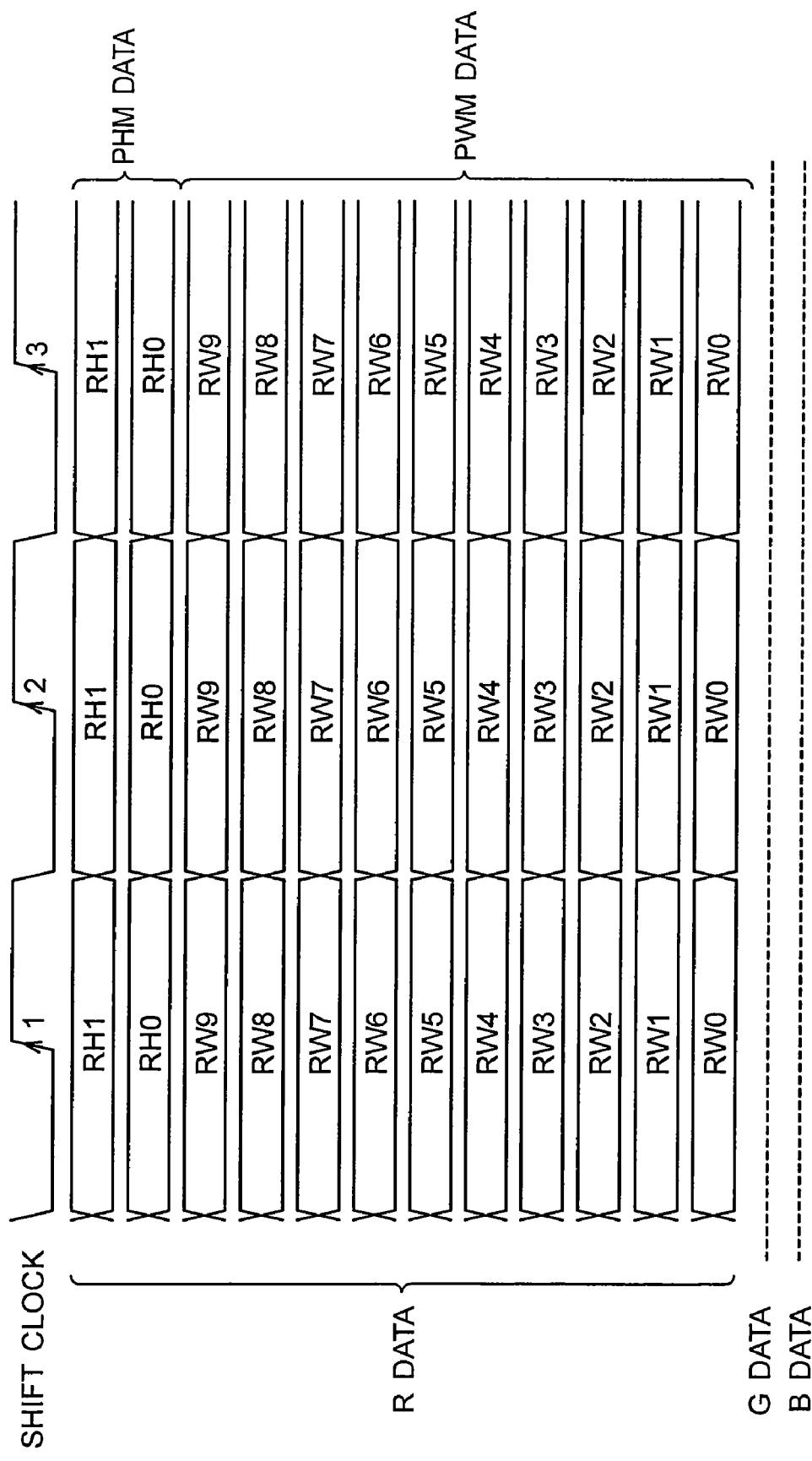
FIG. 2 is a schematic diagram showing the data format of modulation signal data inputted to a parallel/serial conversion circuit in a modulation circuit in accordance with the first embodiment of this invention.

In FIG. 2 is shown the format of driving waveform data inputted to the parallel/serial conversion circuit 6. This is the format of data outputted by the data conversion circuit 5. As shown in FIG. 2, this driving waveform data synchronizes with a shift clock 1, which is one of timing signals generated by the timing generating circuit 4, and is of a data format in which 2-bit PHM (Pulse Height Modulation) data and 10-bit PWM (Pulse Width Modulation) data are constructed in parallel individually for each of RGB. That is, in the state where data is inputted to the parallel/serial conversion circuit 6, gradation data for generating a modulating signal to be applied to the electron emission element corresponding to a luminescent body generating red light is 12-bit parallel data (2-bit height value data and 10-bit timing data). This is the same for the other colors. That is, in this stage, data for forming one modulating signal pulse has a data format in which a parallel number is 12 and in which the number of bits in the direction of time series is one. Here, an example of construction in which PHM data is 2 bits and in which PWM data is 10 bits will be described, but the data format is not necessarily limited to this construction.

Figure 3:
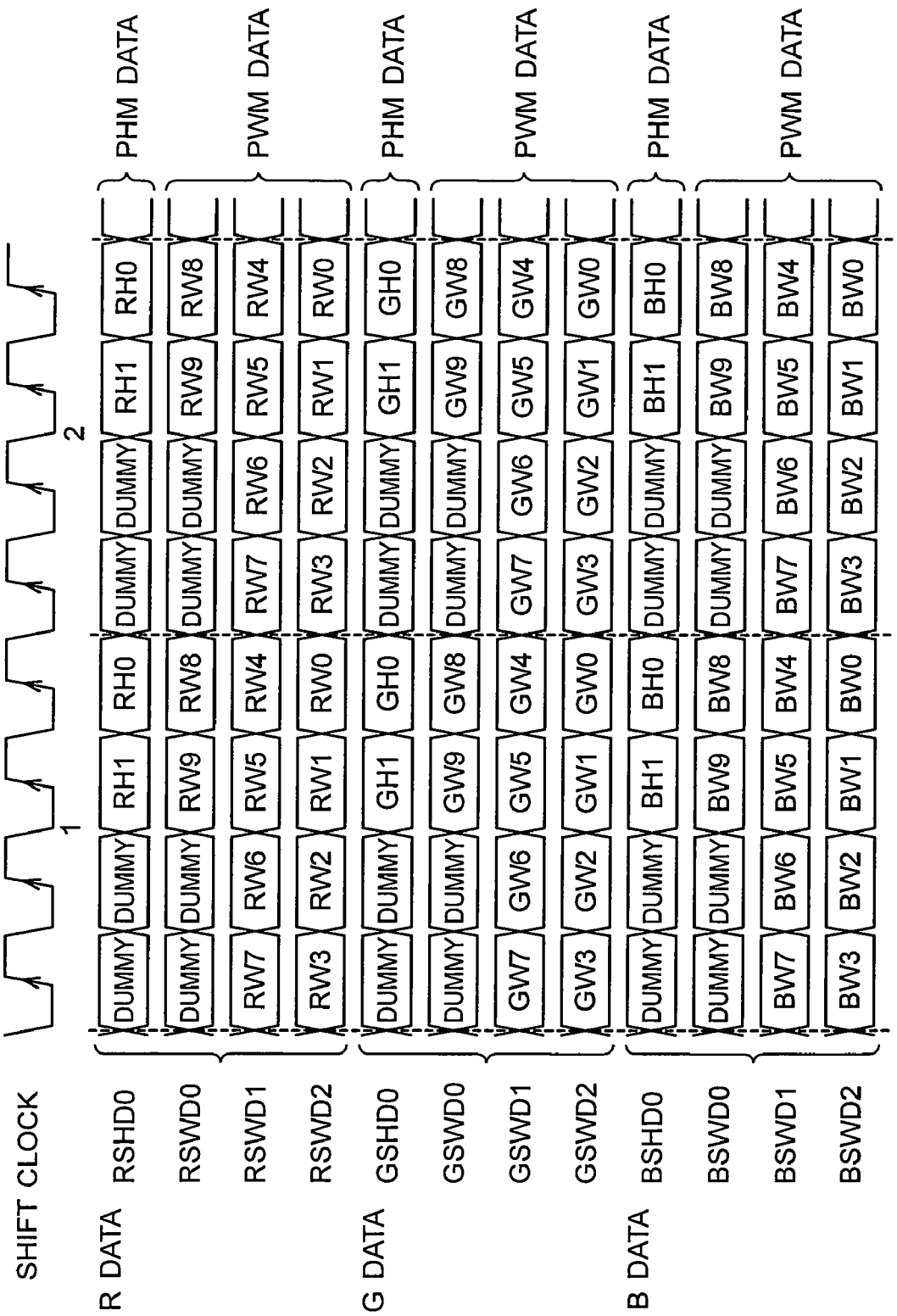
FIG. 3 is a schematic diagram showing the data format of serial data outputted from the parallel/serial conversion circuit in the modulation circuit in accordance with the first embodiment of this invention.

Moreover, in FIG. 3 is shown the format of driving waveform data outputted from the parallel/serial conversion circuit 6. The driving waveform data shown in FIG. 3 synchronizes with a shift clock 2, which is one of timing signals generated by the timing generating circuit 4, and is of a data format in which each of the PHM data and the PWM data is individually made serial every 4 bits. Here, when data whose bits are deficient for 4 bits exists, that is, when there occurs time during which data is not transmitted, dummy data is outputted as pseudo data so as to fill the deficient bits. As will be described later, the modulation circuit is constructed in such a way as to neglect the dummy data, so that arbitrary data can be used as the dummy data. Specifically, a construction can be preferably employed in which a signal level to be outputted to a transmission path is forcibly made to a level of 0 (low level) or a level of 1 (high level).

With this serializing of data, the parallel number of parallel data of 12 bits shown in FIG. 2 is decreased from 12 to 4 and the number of bits in direction of time series is increased from 1 to 4. Specifically, the PHM data that has been parallel data of 2 bits (the parallel number is 2 and the number of bits in the direction of time series is 1) is converted to a format in which the parallel number is 1 and in which the number of bits in the direction of time series is 4. Moreover, the PWM data that has been parallel data of 10 bits (the parallel number is 10 and the number of bits in the direction of time series is 1) is converted to a format in which the parallel number of data is 3 and in which the number of bits in the direction of time series is 4.

Here, it is assumed that the following condition holds, that is, (1) The mixing of the PHM data and the PWM data is not allowed.

When this condition is satisfied, depending on the number of bits of PHM data and the number of bits of PWM data, time during which data bits constructing the PHM data or data bits constructing the PWM data are not transmitted occurs in the above-described time to be used. This is time produced by the mismatch between the number of bits of the PHM data and the number of bits of the PWM data.

Moreover, in the embodiment described here, a preferable embodiment is constructed to satisfy the following two conditions. That is, (2) time to be used as time for transmitting the PHM data for forming one modulating signal (here, time required to serially transmit a signal of 4 bits) in one transmission path is made equal to time to be used as time for transmitting the PWM data for forming the one modulating signal (time required to serially transmit a signal of 4 bits) in the other transmission path, and (3) the transmission speeds (the number of bits to be transmitted for a unit of time) of the respective transmission paths are made equal to each other.

When these two conditions are employed, the above-described time produced by the mismatch of the number of bits when the condition (1) is employed is hard to eliminate.

When the signal level of the transmission path is not determined in this time, a malfunction might occur. Hence, this embodiment is constructed to output arbitrary data (dummy data) in the time, thereby solving this problem.

Specifically, a construction of outputting the PHM data of 2 bits as data of 4 bits is employed. Here, since it is essential only that PHM data can specify four conditions (here, conditions for specifying which height value is the maximum height value that a modulating signal is to have), the PHM data has 2 bits, that is, values of 0, 1, 2, and 3 in a decimal system. These 2 bits are converted to 4 bits. Data of 4 bits can specify arbitrary values of 0 to 15 in the decimal system. Hence, it is possible to convert the original four values of 0, 1, 2, and 3 to arbitrary values of 0 to 15 and to transmit them. However, to reproduce the original PHM data by extracting only specific 2 bits from the data of 4 bits by the modulation circuit, it is preferable that arbitrary data bits are inserted into the same positions of the original data of 2 bits, that is, "00", "01", "10", and "11". Specifically, a construction can be employed in which data bits are inserted before, after, or between the data of 2 bits. In the case of inserting a plurality of data bits like this embodiment, it is also possible to use these insertion positions in combination. For example, when "00" is inserted as arbitrary data bits before the data of 2 bits, the four values described above become "0000", "0001", "0010", and "0011". In this case, the modulation circuit receiving this data may neglect 2 bits in the first half. Since the inserted data bits can be neglected, the inserted data bits do not need to be "00", but other arbitrary data bits can be used. Moreover, for example, a construction can be also employed in which "1" is inserted as an arbitrary data bit in the middle of the data of 2 bits and in which "0" is inserted as an arbitrary data bit in the end of the data of 2 bits. In this case, the four values described above become "0100", "0110", "1100", and "1110". The modulation circuit can reproduce the original PHM data of 2 bits from a bit at the front and a bit at the third digit.

It is also possible to convert the original four values 0, 1, 2, and 3 (in the decimal system) to 7, 8, 9, and 10 (in the decimal system) as arbitrary values of 0 to 15 and to transmit them. In this case, signals of 4 bits become "0111", "1000", "1001", and "1010" and hence the original PHM data cannot be reproduced only by extracting specific 2 bits. Hence, in this embodiment, the PHM data is converted to a value in which arbitrary bits are added to the same positions to the possible values (values corresponding to the state of transmission, that is, values expressed by a binary system because data is here transmitted in two states of a high level and a low level) of the original data and then is transmitted. Binary transmission (construction in which the state of transmission is selected from two states of the high level and the low level) can be preferably employed as the state of transmission of the signal, but other state of transmission (for example, construction in which four states of transmission can be selected) can be employed. That is, the data bit is not necessarily limited to 0 or 1.

This holds good for the PWM data. Various methods can be employed as a method of converting the original PWM data of 10 bits to the data of 12 bits (4 bits are serially transmitted by one transmission path and three transmission paths are used, so that data is converted to data of 12 bits in total). In order for the modulation circuit to neglect specific bits to reproduce the original PWM data of 10 bits, this embodiment is constructed to add arbitrary bits to the same two positions for all values of the original PWM data to convert the PWM data to the data of 12 bits.

The multi-power supply circuit 7 is a power supply circuit constructed to output a plurality of power supply values and a circuit for controlling the modulation circuit 2. The multi-power supply circuit 7 is generally a voltage power supply circuit but is not necessarily limited to this.

The scanning power supply circuit 8 is a power supply circuit of outputting a plurality of power supply values and a circuit for controlling the scanning circuit 3. The scanning power supply circuit 8 is generally a voltage power supply circuit but is not necessarily limited to this.

Figure 4:
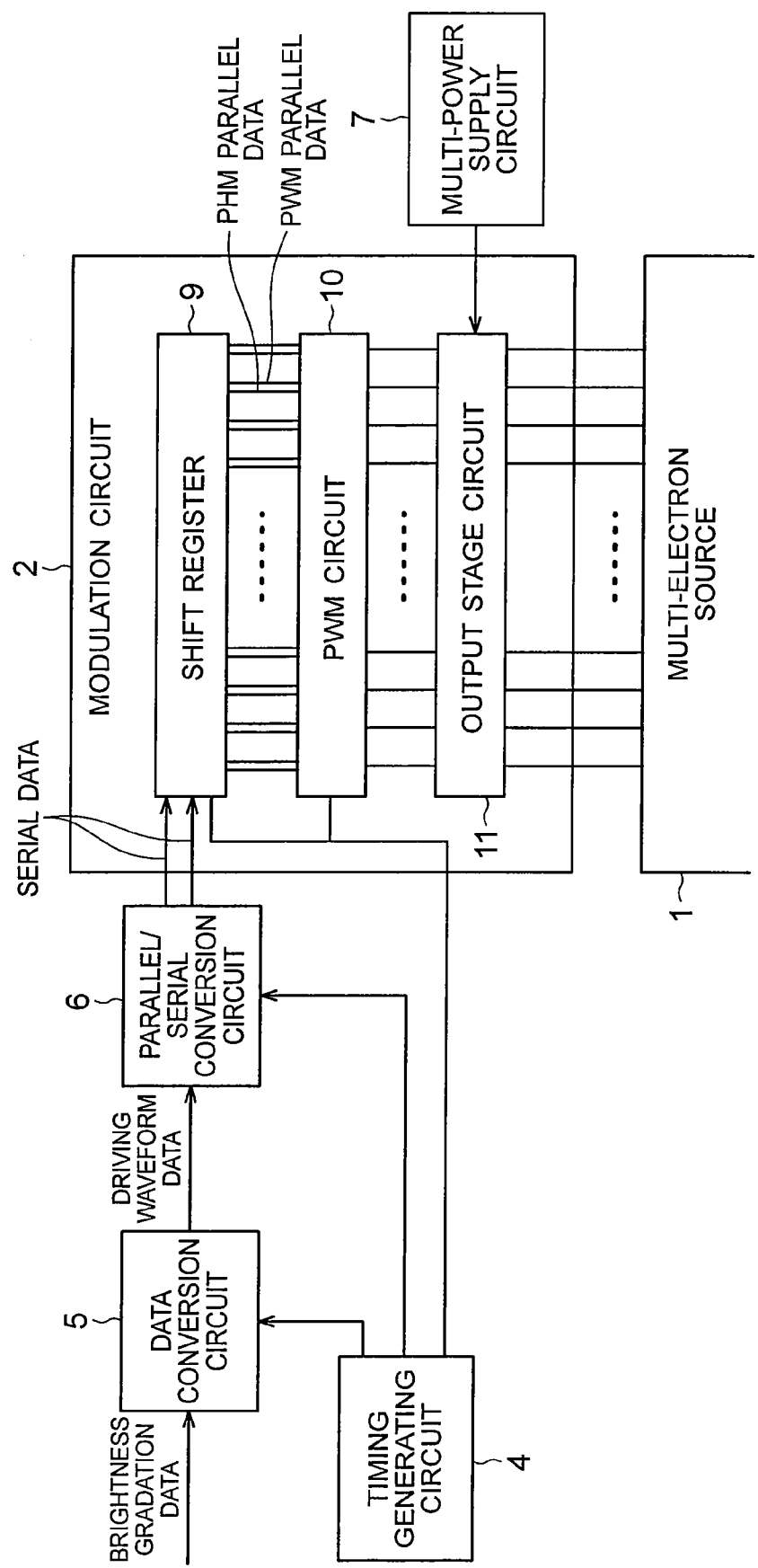
FIG. 4 is the block diagram of a modulation circuit in the driving circuit in accordance with the first embodiment of this invention.

Next, the modulation circuit 2 will be described. In FIG. 4 is shown the internal construction of the modulation circuit 2. As shown in FIG. 4, the modulation circuit 2 is constructed to include a shift register 9, a PWM circuit 10, and an output stage circuit 11.

PHM serial data and PWM serial data, which are serially converted by the parallel/serial conversion circuit 6, are inputted to the shift register 9. Moreover, PHM parallel data and PWM parallel data, which are modulation data corresponding to wirings in the direction of row of the multi-electron source 1, are transferred by the shift register 9.

Figure 5:
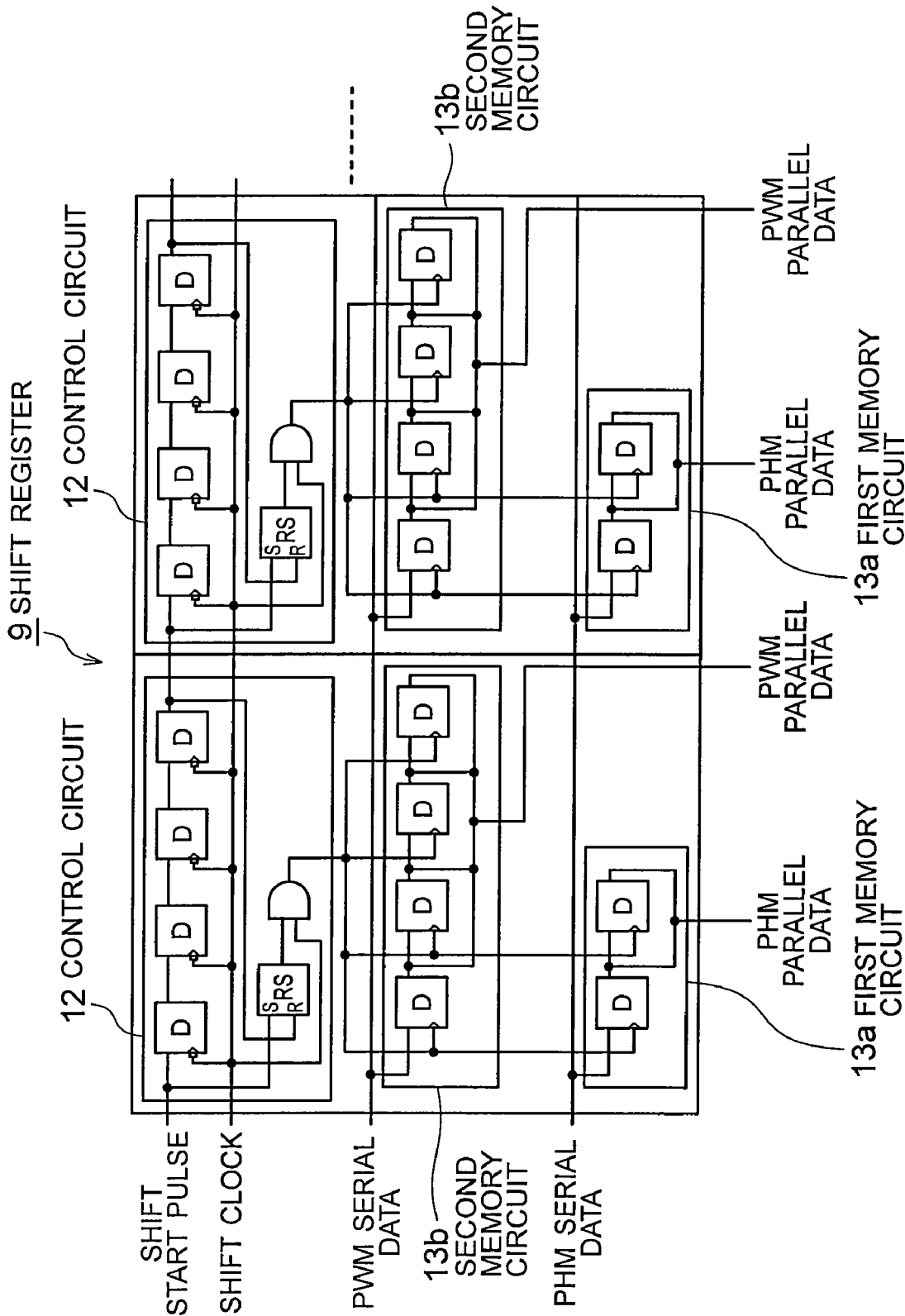
FIG. 5 is the block diagram of a shift register in the modulation circuit in accordance with the first embodiment of this invention.
Figure 6:
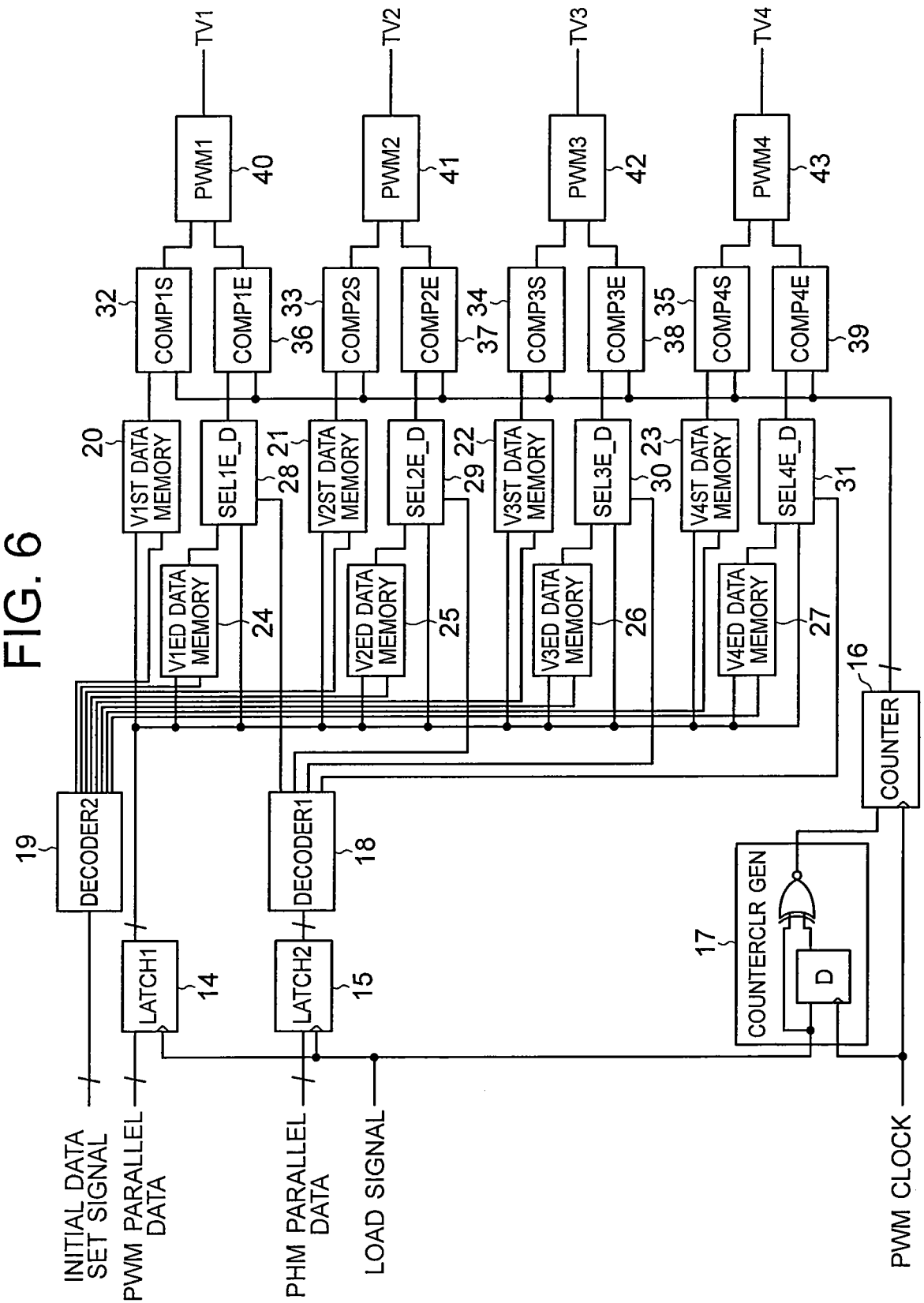
FIG. 6 is the block diagram of a PWM circuit in the modulation circuit in accordance with the first embodiment of this invention.
Figure 7:
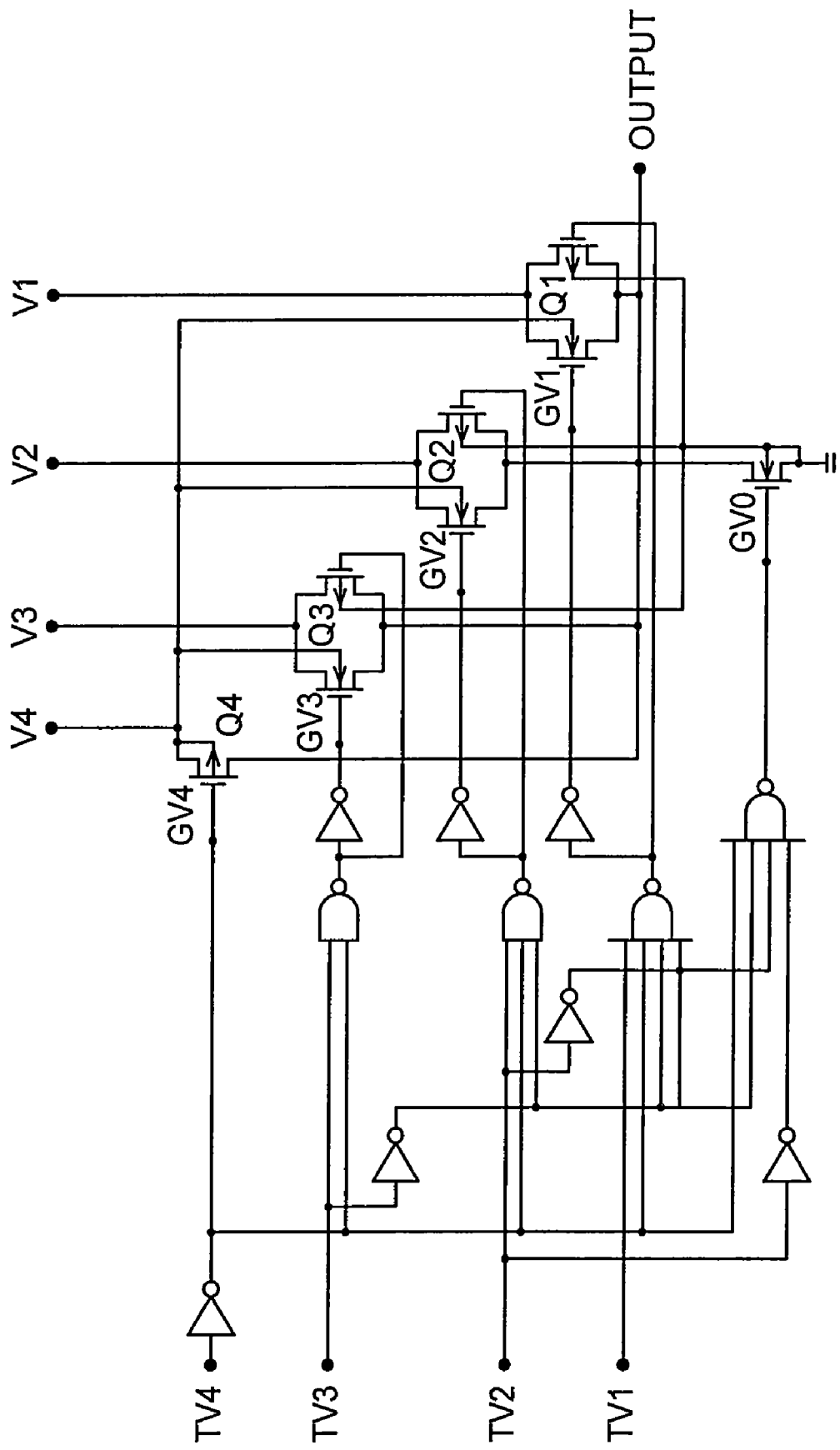
FIG. 7 is the block diagram of an output stage circuit in the modulation circuit in accordance with the first embodiment of this invention.

The PHM parallel data and the PWM parallel data, which are modulation data corresponding to wirings in the direction of row of the multi-electron source 1, are inputted to the PWM circuit 10 from the shift register 9. The PWM circuit 10 outputs signals for specifying the output timings of a plurality of signal levels (which are the electric potentials of signals and correspond to height values) to be outputted by the output stage circuit 11 to the output stage circuit Moreover, timing signals for controlling the shift register 9 and the PWM circuit 10 are inputted to the shift register 9 and the PWM circuit 10 from the timing generating circuit 4. The output stage circuit 11 is a circuit that is connected to the multi-power supply circuit 7 and outputs a modulating signal having a driving waveform to be described later. In FIG. 5 is shown the internal construction of the shift register 9. In FIG. 6 is shown one example of construction of a circuit provided for one of the wirings in the direction of row as the PWM circuit shown in FIG. 4. In FIG. 7 is shown one example of a circuit provided for one of the wirings in the direction of row in the output stage circuit 11 shown in FIG. 4.

As shown in FIG. 5, the shift register 9 is constructed to include a plurality of control circuits 12 and a plurality of memory circuits 13. In this first embodiment, a construction using D flip-flop circuits, an RS flip-flop circuit, and an AND-gate circuit will be described by way of example, but the control circuit 12 and the memory circuit 13 are not necessarily limited to this construction.

As shown in FIG. 5, the PHM serial data, which is serially converted by the parallel/serial conversion circuit 6, is inputted to the first memory circuit 13a. Then, the first memory circuit 13a transfers the PHM parallel data that is the modulation data corresponding to the wirings in the direction of row of the multi-electron source 1.

The second memory circuit 13b has the PWM serial data, which is serially converted by the parallel/serial conversion circuit 6, inputted thereto. Here, while a phrase of "serial data" is used, this phrase means data that at least part of data before format conversion is serially converted, thereby being decreased in the parallel number and is not necessarily limited to data whose parallel number is 1. In actuality, in this PWM serial data of this embodiment, the parallel number is 3. Hence, the second memory circuit 13b also has three systems in accordance with the parallel number. However, to avoid the drawing from becoming unclear by showing all of the systems, in FIG. 5, the three systems are collectively shown. This second memory circuit 13b transfers the PWM parallel data that is the modulation data corresponding to the wirings in the direction of row of the multi-electron source 1.

Moreover, the control circuit 12 has a shift start pulse and a shift clock, which are one of timing signals generated by the timing generating circuit 4, inputted thereto. Further, the control circuit 12 generates control signals for recording the PHM serial data and the PWM serial data, which are modulation data corresponding to wirings in the direction of row of the multi-electron source 1, in the first memory circuit 13a and the second memory circuit 13b.

According to the recording control signals generated by the control circuit 12, the PHM serial data is recorded in the first memory circuit 13a and the PWM serial data is recorded in the second memory circuit 13b.

The data, which is outputted from the first memory circuit 13a and the second memory circuit 13b, is constructed in parallel and is outputted to the PWM circuit 10 in a collective manner according to the wirings in the direction of row of the multi-electron source 1.

Specifically, the PWM serial data of 4 bits in the direction of time series is sequentially transferred by 4 flip flops of the second memory circuit 13b shown in FIG. 5. In the state where the PWM serial data of 4 bits in the direction of time series is recorded in 4 flip flops, when an output timing is specified to the flip flops, parallel data of 4 bits is outputted. This processing is performed in parallel for three systems, whereby the PWM parallel data of 12 bits is outputted. However, since 2 bits are dummy data, the dummy data is neglected and the PWM parallel data of 10 bits is actually outputted.

Moreover, the PHM serial data of 4 bits in the direction of time series is inputted to the first memory circuit 13a. However, since 2 bits out of the 4 bits are dummy data, the memory circuit 13a is constructed of 2 flip flops to record 2 bits except for the dummy data. With this, the PHM serial data is paralleled.

Next, the PWM circuit 10 will be described by the use of FIG. 6. Here, the PWM circuit 10 shown in FIG. 6 is only one example and is not limited to this circuit construction.

Like the embodiment shown here, in a construction in which both of the control in the direction of amplitude and the control in the direction of time width amplitude of a modulating signal are performed to generate the modulating signal, various complicated modulating signal waveforms can be generated. For example, a construction can be also employed in which height value data is generated in correspondence to each unit of time of time width of the whole pulses of the modulating signal (corresponding to one period of a clock signal to be counted in a construction of setting the time width by counting the clock signal) so as to control the height value individually for each unit of time. However, it is not necessary to employ such a complicated construction. Specifically, it is only essential that the PHM data of height value data includes information capable of determining the height value of at least one point of the waveform of one modulating signal in correspondence to brightness to be required. Specifically, information for specifying a maximum height value in the modulating signal can be preferably employed as information for determining the height value of at least one point. Here, the magnitude of the height value is not always the magnitude of the electric potential. For example, when the selected electric potential of the scanning signal is higher than electric potential corresponding to the ON state of the modulating signal, the height value of the modulating signal having lower electric potential becomes larger.

Moreover, a construction can be also employed in that the PWM data of timing data, for example, includes all information for determining each transition timing (timing of starting control for changing a state controlled to a certain height value to another height value) of each height value of waveform of the modulating signal. However, it is not necessary to employ such a complicated construction. Specifically, it is only essential that the PWM data of timing data includes information capable of determining at least one timing of changing the signal level of the modulating signal to another signal level in correspondence to brightness to be required. Specifically, a construction can be preferably employed in which data capable of determining a timing of changing the maximum height value of height values to be used by a certain modulating signal to a smaller height value is used as timing data. Here, various methods can be used as a method of determining timing on the basis of data. A construction can be preferably employed in which a lapse of time from a reference timing is counted and in which timing data directly or indirectly specifies the counted time. Specifically, a construction can be preferably employed in which the lapse of time is counted by a clock. In this case, the specifying of the total counted time can be performed by directly or indirectly specifying the number of counts.

The PWM circuit 10 in accordance with this first embodiment includes a latch circuit 14 for the PWM parallel data and a latch circuit 15 for the PHM parallel data as latch circuits. Moreover, this PWM circuit 10 includes a counter circuit 16 and a counter clearing signal generating circuit 17 as counter-relating circuits. Here, in this first embodiment, the counter clearing signal generating circuit 17 is constructed by the use of a D flip-flop circuit and an XOR circuit, but this circuit construction is strictly for the purpose for one example and the counter clearing signal generating circuit 17 is not necessarily limited to this circuit construction.

Further, the PWM circuit 10 is provided with a PHM data decoding circuit 18 and an initial data setting signal decoding circuit 19 as decoding circuits, and is provided with a V1 start data memory circuit 20, a V2 start data memory circuit 21, a V3 start data memory circuit 22, a V4 start data memory circuit 23, a V1 end data memory circuit 24, a V2 end data memory circuit 25, a V3 end data memory circuit 26, and a V4 end data memory circuit 27 as memory circuits.

Still further, the PWM circuit 10 includes a V1 end data selecting circuit 28, a V2 end data selecting circuit 29, a V3 end data selecting circuit 30, and a V4 end data selecting circuit 31 as end data selecting circuits, and includes a V1 start data comparator 32, a V2 start data comparator 33, a V3 start data comparator 34, a V4 start data comparator 35, a V1 end data comparator 36, a V2 end data comparator 37, a V3 end data comparator 38, and a V4 end data comparator 39 as data comparing circuits.

Still further, the PWM circuit 10 includes a V1 pulse width generating circuit 40, a V2 pulse width generating circuit 41, a V3 pulse width generating circuit 42, and a V4 pulse width generating circuit 43 as pulse width generating circuits.

Next, the PWM circuit 10 in accordance with the first embodiment, which is constructed in the above manner, will be described.

First, the latch circuit 14 for the PWM parallel data is a circuit for latching the PWM parallel data of the modulation data, which is recorded in the second memory circuit 13b in the shift register 9 and corresponds to the wirings in the direction of row of the multi-electron source 1, according to the timing of a load signal that is one of timing signals generated by the timing generating circuit 4.

Further, the latch circuit 15 for the PHM parallel data is a circuit for latching the PHM parallel data of the modulation data, which is recorded in the first memory circuit 13a in the shift register 9 and corresponds to the wirings in the direction of row of the multi-electron source 1, according to the timing of a load signal that is one of timing signals generated by the timing generating circuit 4.

Still further, the counter circuit 16 is a circuit for outputting counter data for determining internal timings to the V1 start data comparator 32, the V2 start data comparator 33, the V3 start data comparator 34, the V4 start data comparator 35, the V1 end data comparator 36, the V2 end data comparator 37, the V3 end data comparator 38, and the V4 end data comparator 39 on the basis of a PWM clock that is one of timing signals generated by the timing generating circuit 4 and a counter clearing signal generated by the counter clearing signal generating circuit 17.

Still further, the counter clearing signal generating circuit 17 is a circuit for generating a signal of clearing a counter for determining an internal timing from a load signal, which is one of timing signals generated by the timing generating circuit 4, and a PWM clock.

The PHM data decoding circuit 18 is a decoding circuit for generating a signal of selecting the V1 end data selecting circuit 28, the V2 end data selecting circuit 29, and the V3 end data selecting circuit 30 according to the PHM parallel data latched by the latch circuit 15 for the PHM parallel data.

In this first embodiment, four selection signals are generated according to the PHM parallel data of 2 bits. That is, when the PHM data="00", "1" is inputted to the selection signal of the V1 end data selecting circuit 28 and the selection signals of the other selecting circuits become "0". Here, "00" shows a numerical value in a binary display. Further, when the PHM data="01", "1" is inputted to the selection signal of the V2 end data selecting circuit 29 and the selection signals of the other selecting circuits become "0". Still further, when the PHM data="10", "1" is inputted to the selection signal of the V3 end data selecting circuit 30 and the selection signals of the other selecting circuits become "0". Still further, when the PHM data="11", "1" is inputted to the selection signal of the V4 end data selecting circuit 31 and the selection signals of the other selecting circuits become "0".

Moreover, the initial data setting signal decoding circuit 19 in the PWM circuit 10 is a decoding circuit of generating write signals for recording the PWM data latched by the latch circuit 14 for the PWM parallel data to the V1 start data memory circuit 20, the V2 start data memory circuit 21, the V3 start data memory circuit 22, the V4 start data memory circuit 23, the V1 end data memory circuit 24, the V2 end data memory circuit 25, the V3 end data memory circuit 26, and the V4 end data memory circuit 27 according to initial data setting signal that is one of timing signals generated by the timing generating circuit 4.

In this first embodiment, 8 selection signals are generated according to the initial data setting signal of 3 bits.

That is, when the initial data setting signal "000", only the write signal of the V1 start data memory circuit 20 becomes on and data (V1 start data: this is such data for specifying timing that can be previously given in the same path as the PWM data), which specifies a position where a height value starts to change to V1 latched by the latch circuit 14 for the PWM parallel data (change in the direction in which the height value is enlarged), is recorded in the V1 start data memory circuit 20.

When the initial data setting signal="001", only the write signal of the V2 start data memory circuit 21 becomes on and data (V2 start data: this is such data for specifying timing that is previously given in the same path as the PWM data), which specifies a position where a height value starts to change to V2 latched by the latch circuit 14 for the PWM parallel data (change in the direction in which the height value is enlarged), is recorded in the V2 start data memory circuit 21.

When the initial data setting signal="010", only the write signal of the V3 start data memory circuit 22 becomes on and data (V3 start data: this is such data for specifying timing that is previously given in the same path as the PWM data), which specifies a position where a height value starts to change to V3 latched by the latch circuit 14 for the PWM parallel data (change in the direction in which the height value is enlarged), is recorded in the V3 start data memory circuit 22.

When the initial data setting signal="011", only the write signal of the V4 start data memory circuit 23 becomes on and data (V4 start data: this is such data for specifying timing that is previously given in the same path as the PWM data), which specifies a position where a height value starts to change to V4 latched by the latch circuit 14 for the PWM parallel data (change in the direction in which the height value is enlarged), is recorded in the V4 start data memory circuit 23.

When the initial data setting signal="100", only the write signal of the V1 end data memory circuit 24 becomes on and data (V1 end data: this is such data for specifying timing that is previously given in the same path as the PWM data), which specifies a position where V1 latched by the latch circuit 14 for the PWM parallel data starts to change to a lower height value, is recorded in the V1 end data memory circuit 24.

When the initial data setting signal="101", only the write signal of the V2 end data memory circuit 25 becomes on and data (V2 end data: this is such data for specifying timing that is previously given in the same path as the PWM data), which specifies a position where V2 latched by the latch circuit 14 for the PWM parallel data starts to change to a lower height value, is recorded in the V2 end data memory circuit 25.

When the initial data setting signal="110", only the write signal of the V3 end data memory circuit 26 becomes on and data (V3 end data: this is such data for specifying timing that is previously given in the same path as the PWM data), which specifies a position where V3 latched by the latch circuit 14 for the PWM parallel data starts to change to a lower height value, is recorded in the V3 end data memory circuit 26.

When the initial data setting signal="111", only the write signal of the V4 end data memory circuit 27 becomes on and data (V4 end data: this is such data for specifying timing that is previously given in the same path as the PWM data), which specifies a position where V4 latched by the latch circuit 14 for the PWM parallel data starts to change to a lower height value, is recorded in the V4 end data memory circuit 27.

The above-described parameters (the V1 start data, the V2 start data, the V3 start data, and the V4 start data, the V1 end data, the V2 end data, the V3 end data, and the V4 end data) for forming a driving waveform are sequentially transferred in a period, which includes a device starting time and during which an image is not displayed, to the data memory circuits 20 to 27 where these start position specifying data and end position specifying data are recorded. With this, the parameters (the V1 start data, the V2 start data, the V3 start data, and the V4 start data, the V1 end data, the V2 end data, the V3 end data, and the V4 end data) are recorded in the data memory circuits 20 to 27.

Further, the V1 end data selecting circuit 28 in the PWM circuit 10 is a selecting circuit of selecting either the PWM data latched by the latch circuit 14 for the PWM parallel data or the V1 end data recorded in the V1 end data memory circuit 24. This selection is made by a selection signal related to the PHM data outputted from the PHM data decoding circuit 18.

Still further, the V2 end data selecting circuit 29 is a selecting circuit of selecting either the PWM data latched by the latch circuit 14 for the PWM parallel data or the V2 end data recorded in the V2 end data memory circuit 25 by a selection signal related to the PHM data outputted from the PHM data decoding circuit 18.

Similarly, the V3 end data selecting circuit 30 is a selecting circuit of selecting either the PWM data latched by the latch circuit 14 for the PWM parallel data or the V3 end data recorded in the V3 end data memory circuit 26 by a selection signal related to the PHM data outputted from the PHM data decoding circuit 18.

Further, similarly, the V4 end data selecting circuit 31 is a selecting circuit of selecting either the PWM data latched by the latch circuit 14 for the PWM parallel data or the V4 end data recorded in the V4 end data memory circuit 27 by a selection signal related to the PHM data outputted from the PHM data decoding circuit 18.

Each of the V1 end data selecting circuit 28 to the V4 end data selecting circuit 31 selects the PWM data when the selection signal is "1" and selects end data recorded in the corresponding end data memory circuit when the selection signal is "0".

Further, the V1 start data comparator 32 is a comparator for generating a V1 start pulse when the V1 start data recorded in the V1 start data memory circuit 20 agrees with the count data of the counter circuit 16 of determining an internal timing. The V2 start data comparator 33 is a comparator for generating a V2 start pulse when the V2 start data recorded in the V2 start data memory circuit 21 agrees with the count data of the counter circuit 16. The V3 start data comparator 34 is a comparator for generating a V3 start pulse when the V3 start data recorded in the V3 start data memory circuit 22 agrees with the count data of the counter circuit 16. The V4 start data comparator 35 is a comparator for generating a V4 start pulse when the V4 start data recorded in the V4 start data memory circuit 23 agrees with the count data of the counter circuit 16.

Still further, the V1 end data comparator 36 is a comparator for generating V1 end pulse when the V1 end data selected by the V1 end data selecting circuit 28 or the PWM data agrees with the count data of the counter circuit 16. The V2 end data comparator 37 is a comparator for generating V2 end pulse when the V2 end data selected by the V2 end data selecting circuit 29 or the PWM data agrees with the count data of the counter circuit 16. The V3 end data comparator 38 is a comparator for generating V3 end pulse when the V3 end data selected by the V3 end data selecting circuit 30 or the PWM data agrees with the count data of the counter circuit 16. The V4 end data comparator 39 is a comparator for generating V4 end pulse when the V4 end data selected by the V4 end data selecting circuit 31 or the PWM data agrees with the count data of the counter circuit 16.

Still further, the V1 pulse width generating circuit 40 is a PWM circuit of outputting a pulse width waveform TV1. The pulse width waveform TV1 is a waveform that rises up by a V1 start pulse generated in the V1 start data comparator 32 and falls down by a V1 end pulse generated in the V1 end data comparator 36.

Still further, the V2 pulse width generating circuit 41 is a PWM circuit of outputting a pulse width waveform TV2. The pulse width waveform TV2 is a waveform that rises up by a V2 start pulse generated in the V2 start data comparator 33 and falls down by a V2 end pulse generated in the V2 end data comparator 37.

Still further, the V3 pulse width generating circuit 42 is a PWM circuit of outputting a pulse width waveform TV3. The pulse width waveform TV3 is a waveform that rises up by a V3 start pulse generated in the V3 start data comparator 34 and falls down by a V3 end pulse generated in the V3 end data comparator 38.

Still further, the V4 pulse width generating circuit 43 is a PWM circuit of outputting a pulse width waveform TV4. The pulse width waveform TV4 is a pulse width waveform that rises up by a V4 start pulse generated in the V4 start data comparator 35 and falls down by a V4 end pulse generated in the V4 end data comparator 39.

In this regard, in this first embodiment, a circuit in which a start pulse and an end pulse are inputted as a set input and a reset input in the RS flip-flop circuit, respectively, is employed as a PWM circuit, but the PWM circuit is not necessarily limited to this construction.

Still further, as shown in FIG. 7, the electric potentials V1 to V4 are in the relationship of 0<V1<V2<V3<V4 and are outputted in response to the PWM output waveforms TV1, TV2, TV3, and TV4, respectively. Moreover, transistors Q1, Q2, Q3, and Q4 are constructed to be able to output electric potentials V1 to V4 to an output terminal OUTPUT when they are turned on. Here, the transistors Q1 to Q4 can be constructed of pair transistors.

Figure 8:
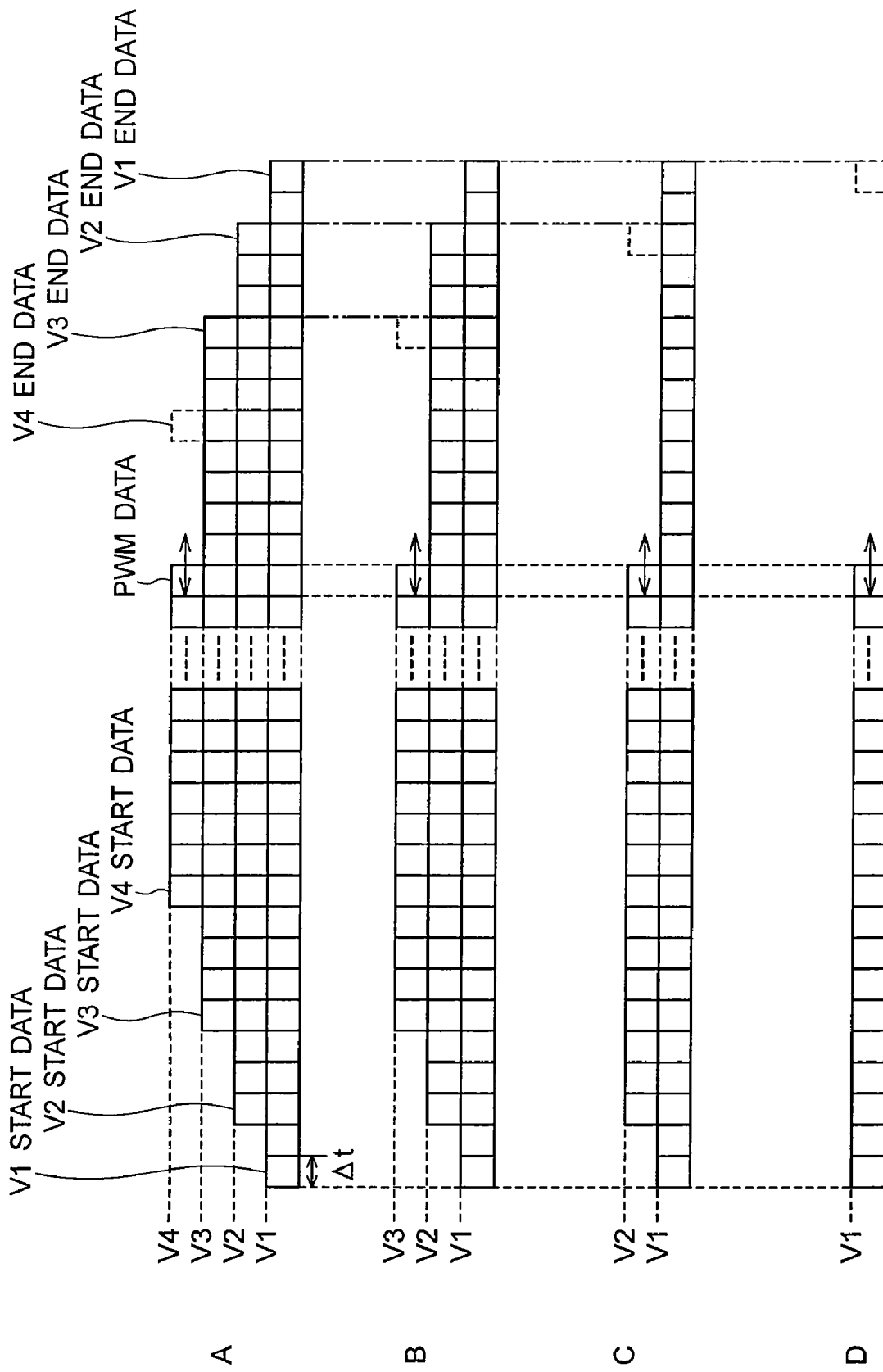
FIG. 8 is a waveform diagram showing one example of an output driving waveform of the output stage circuit in the modulation circuit in accordance with the first embodiment of this invention.

Next, a driving waveform outputted from the output terminal OUTPUT of the modulation circuit 2 constructed in the above manner will be described with reference to FIG. 8.

In FIG. 8A is shown a driving waveform using the electric potentials V1 to V4 when the PHM data="11". As shown in FIG. 8A, the rising position of the electric potential V1 is determined by the V1 start data stored in the V1 start data memory circuit 20. The rising position of the electric potential V2 is determined by the V2 start data stored in the V2 start data memory circuit 21. The rising position of the electric potential V3 is determined by the V3 start data stored in the V3 start data memory circuit 22. The rising position of the electric potential V4 is determined by the V4 start data stored in the V4 start data memory circuit 23.

On the other hand, the falling position of the electric potential V1 is determined by the V1 end data stored in the V1 end data memory circuit 24. The falling position of the electric potential V2 is determined by the V2 end data stored in the V2 end data memory circuit 25. The falling position of the electric potential V3 is determined by the V3 end data stored in the V3 end data memory circuit 26. The falling position of the electric potential V4 is determined by the PWM data.

In FIG. 8B is shown a driving waveform using the electric potentials V1 to V3 when the PHM data="10".

As shown in FIG. 8B, the rising position of the electric potential V1 is determined by the V1 start data stored in the V1 start data memory circuit 20. The rising position of the electric potential V2 is determined by the V2 start data stored in the V2 start data memory circuit 21. The rising position of the electric potential V3 is determined by the V3 start data stored in the V3 start data memory circuit 22.

On the other hand, the falling position of the electric potential V1 is determined by the V1 end data stored in the V1 end data memory circuit 24. The falling position of the electric potential V2 is determined by the V2 end data stored in the V2 end data memory circuit 25. The falling position of the electric potential V3 is determined by the PWM data.

Further, in FIG. 8C is shown a driving waveform using the electric potentials V1 and V2 when the PHM data="01".

As shown in FIG. 8C, the rising position of the electric potential V1 is determined by the V1 start data stored in the V1 start data memory circuit 20. The rising position of the electric potential V2 is determined by the V2 start data stored in the V2 start data memory circuit 21. The falling position of the electric potential V1 is determined by the V1 end data stored in the V1 end data memory circuit 24. The falling position of the electric potential V2 is determined by the PWM data.

In FIG. 8D is shown a driving waveform using the electric potentials V1 when the PHM data="01". As shown in FIG. 8D, the rising position of the electric potential V1 is determined by the V1 start data stored in the V1 start data memory circuit 20. The falling position of the electric potential V1 is determined by the PWM data.

As is clear from the above description, in this embodiment, in the modulating signal corresponding to each gradation data, the pulse width of portion controlled to each maximum height value is determined (modulated) by timing data (PWM data) constructing the gradation data. The shape of the other portion (portion except the portion controlled to the maximum height value) of each modulating signal can be determined independently of the gradation data by the V1 start data, the V2 start data, the V3 start data, the V4 start data, the V3 end data, the V2 end data, and the V1 end data. However, how to determine the pulse width of which portion of the modulating signal in correspondence to the gradation data is not necessarily limited to this construction. In this embodiment, the modulating signal using the second and subsequent height values (corresponding to above-described V2, V3, and V4) is made to pass a middle height value so that a height value should not rise up from its reference level directly to a maximum height value in the modulating signal in the rising portion and the falling portion of the modulating signal. This can prevent ringing from being caused by the application of the modulating signal. Specifically, the rising portion and falling portion of the modulating signal is constructed to be formed stepwise, which is realized by setting the V1 start data, the V2 start data, the V3 start data, the V4 start data, the V3 end data, the V2 end data, and the V1 end data at timings when the stepwise shape can be obtained.

As described above, according to the driving circuit of the display element in accordance with this first embodiment, the PWM data and the PHM data are serialized in such a way as to be transmitted to the modulation circuit 2 by the transmission paths (transmission lines) the number of which is smaller than the number of bits of data bits constructing each of the PWM data and the PHM data. With this, two kinds of data having different attributes for performing modulation of the combined use of amplitude modulation and pulse width modulation can be transmitted without greatly increasing the number of transmission lines in the construction.

In particular, in this embodiment, in any transmission path for transmitting the gradation data from the parallel/serial conversion circuit to the modulation circuit, the height value data and the timing data, which are different in attribute from each other, are prevented from being mixed with each other.

For this reason, there is provided a merit that a construction for separating the height value data from the timing data does not need to be provided after the gradation data is transmitted from the parallel/serial conversion circuit to the modulation circuit.

Second Embodiment

Next, the second embodiment of this invention will be described. The driving circuit of this second embodiment is generally the same as the first embodiment. That is, as shown in FIG. 1, the driving circuit of this second embodiment is constructed to include the modulation circuit 2, the scanning circuit 3, the timing generating circuit 4, the data conversion circuit 5, the parallel/serial conversion circuit 6, the multi-power supply circuit 7, and the scanning power supply circuit 8 and is a circuit for driving the multi-electron source 1.

Moreover, the scanning circuit 3 is a circuit connected to the wirings in the direction of line of the multi-electron source 1 and for selecting the line of the multi-electron source 1 to which the output or signal of the modulation circuit 2 is supplied. In general, the line sequential scanning of selecting lines one by one sequentially is performed. However, scanning is not necessarily limited to the line sequential scanning but it is possible to perform skip scanning or to select a plurality of lines at the same time or to select lines by area. That is, the scanning circuit 3 is selection means that supplies a selecting electric potential to wirings in the direction of line, to which the plurality of electron sources to be driven out of the plurality of electron sources included in the multi-electron source 1 are connected, for a predetermined time and supplies a non-selecting electric potential to the wirings for the other time, thereby selecting lines. Circuit construction other than the modulation circuit 2 to be described below and the peripheral circuit for supplying serial data to this modulation circuit 2 is the same as in the first embodiment and hence its description will not be repeated here.

Figure 9:
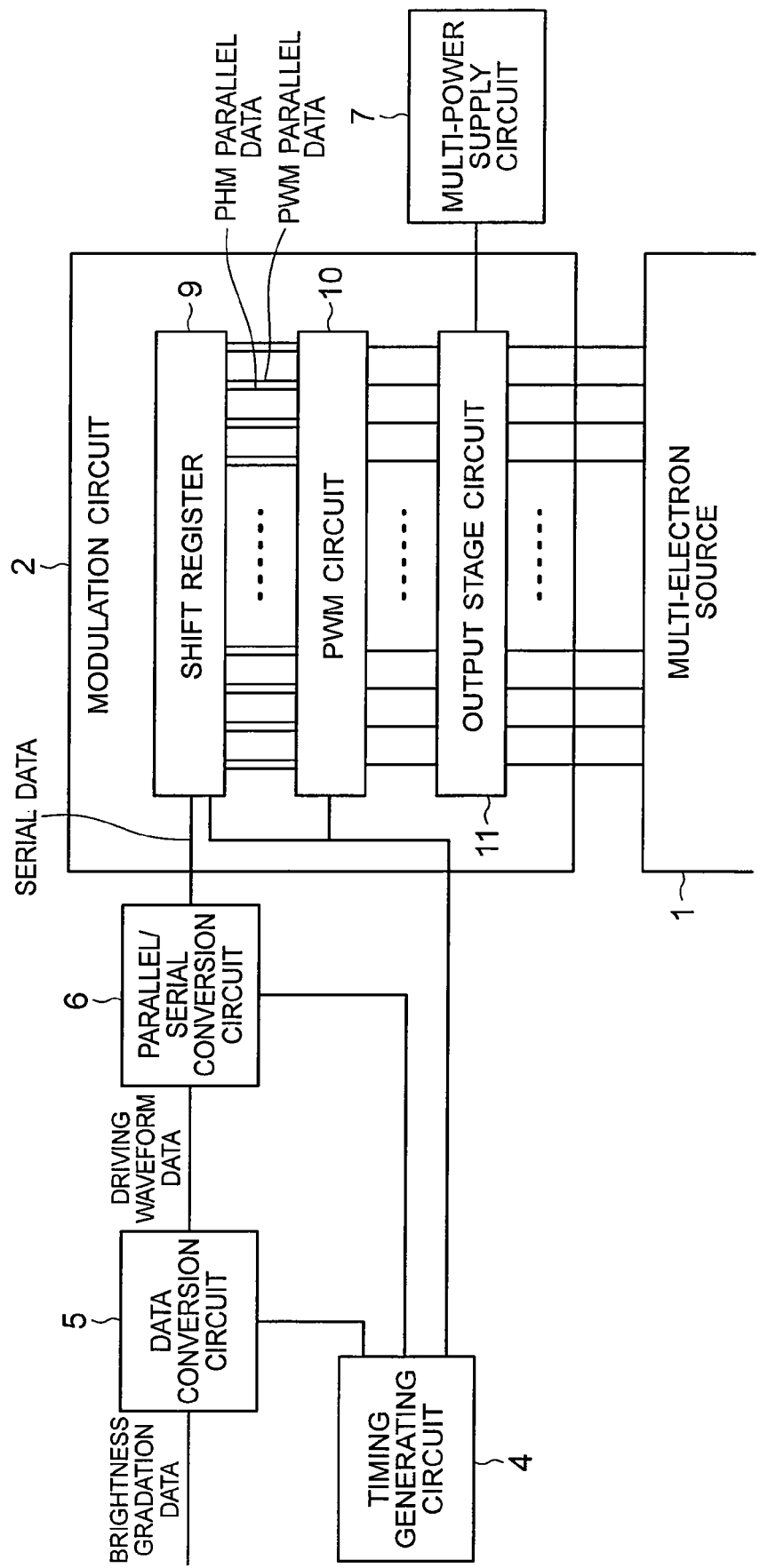
FIG. 9 is the block diagram of a modulation circuit in a driving circuit in accordance with a second embodiment of this invention.

Next, the modulation circuit 2 and the supply of serial data in accordance with the second embodiment of this invention will be described. In FIG. 9 is shown the internal construction of the modulation circuit 2 and a peripheral circuit for supplying serial data to the modulation circuit 2. As shown in FIG. 9, the modulation circuit 2 in accordance with this second embodiment, as is the case with the first embodiment, is constructed to include the shift register 9, the PWM circuit 10, and the output stage circuit 11. Here, the output stage circuit 11 is a circuit connected to the multi-power supply circuit 7 and for outputting a modulating signal having a driving waveform to be described later.

The data conversion circuit 5 is a circuit for converting brightness gradation data for controlling the brightness gradation of the multi-electron source 1 from the outside to driving waveform data format suitable for the modulation circuit 2.

The parallel/serial conversion circuit 6 is a circuit that handles brightness gradation data supplied from the data conversion circuit 5 as across-the-board parallel data irrespective of the attributes of the PHM data and the PWM data and converts the parallel data to serial differential data. In this second embodiment, the case of differential data will be described by way of an example, but data is not necessarily limited to the differential data. Specifically, for example, single end data or a pseudo-differential data can be also utilized.

Figure 10:
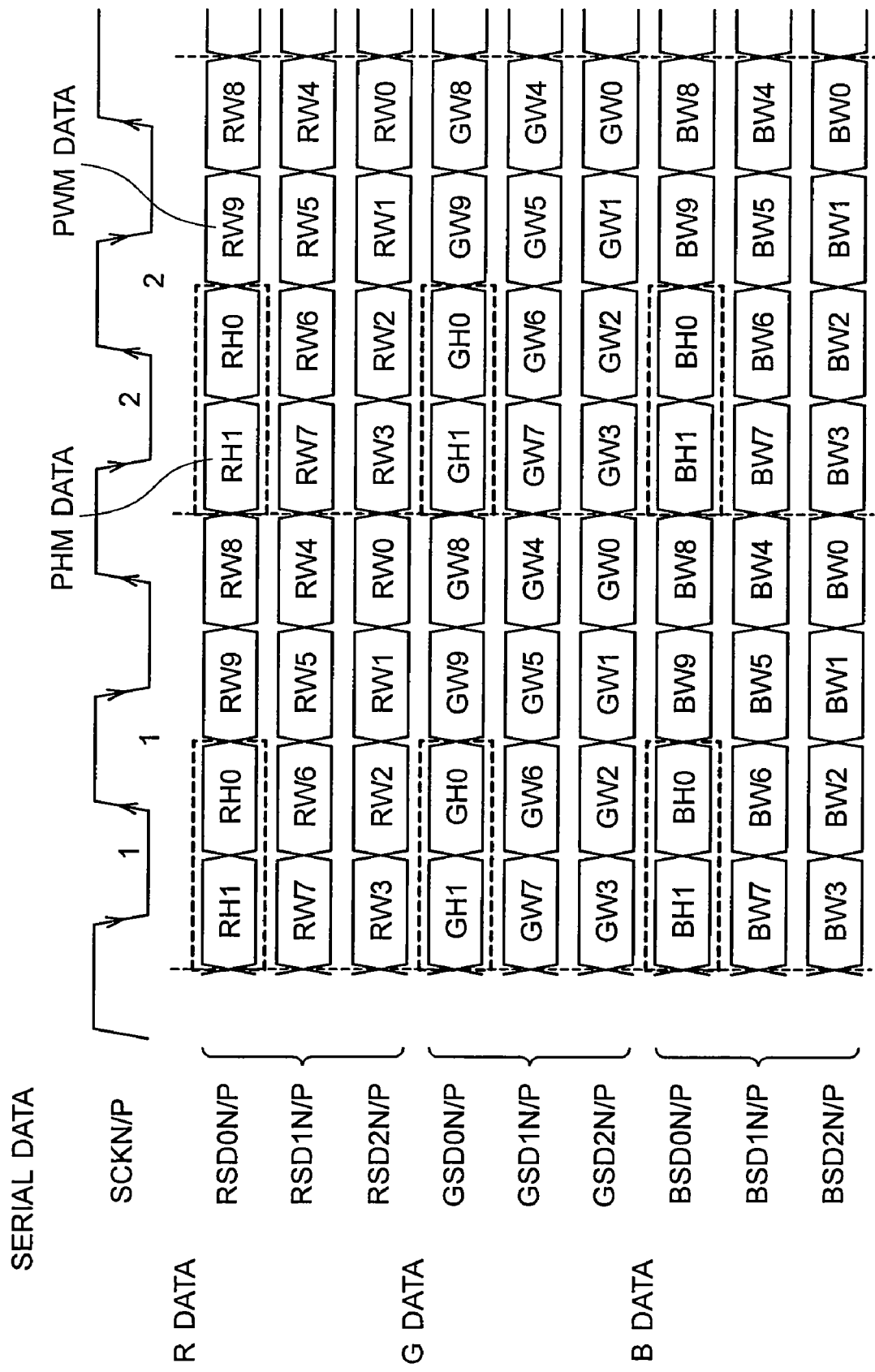
FIG. 10 is a schematic diagram showing the data format of serial data outputted from the parallel/serial conversion circuit in the modulation circuit in accordance with the second embodiment of this invention.

Next, with reference to FIG. 2 and FIG. 10, a data format inputted to the parallel/serial conversion circuit 6 and a data format outputted from the parallel/serial conversion circuit 6 will be described. Here, the format of a driving waveform data inputted to the parallel/serial conversion circuit 6 is the same as in the first embodiment and hence its description will not be repeated here. In FIG. 10 is shown the format of a driving waveform data outputted from the parallel/serial conversion circuit 6 of this embodiment.

That is, as shown in FIG. 2, driving waveform data in accordance with the second embodiment, as is the case with the first embodiment, is of a data format in which the PHM data of 2 bits and the PWM data of 10 bits are constructed in parallel individually for each of RBG. Then, this driving waveform data is synchronized with the shift clock 1 that is one of timing signals supplied from the timing generating circuit 4 to the data conversion circuit 5. Here, in this second embodiment, a case where the PHM data is 2 bits and where the PWM data is 10 bits will be described by way of example. However, the PWM data is not necessarily limited to 10 bits but can include the number of bits other than 10.

As shown in FIG. 10, serial data in accordance with this second embodiment has a data format in which data is serialized every 4 bits as the across-the-board data irrespective of the attributes of the PHM data or the PWM data in synchronization with the shift clock 2 that is one of timing signals generated by the timing generating circuit 4. Here, this second embodiment employs a construction in which the driving waveform is triggered at both of the rising edge and the falling edge of the shift clock, but the construction is not necessarily limited to this construction. Moreover, in this second embodiment, it is assumed that the number of data bits is the value of multiples of 4 (value that is divisible by 4 without remainder). However, when the number of data bits is not divisible by 4 without remainder, that is, when there occurs time during which data is not transmitted, data that is deficient for 4 bits is filled with dummy data as pseudo-data and then is outputted.

Moreover, as shown in FIG. 9, the modulation circuit 2 is connected to the wirings in the direction of row of the multi-electron source 1. This modulation circuit 2 is a circuit for supplying a modulating signal of the multi-electron source 1 according to the modulation data (gradation data) to which the PHM data and the PWM data are serially converted across the board by the parallel/serial conversion circuit 6. That is, this modulation circuit 2 functions as modulation means for supplying a modulating signal modulated on the basis of the modulation data inputted from the parallel/serial conversion circuit 6 to the wirings in the direction of row, which are respectively connected to the plurality of electron sources.

Figure 11:
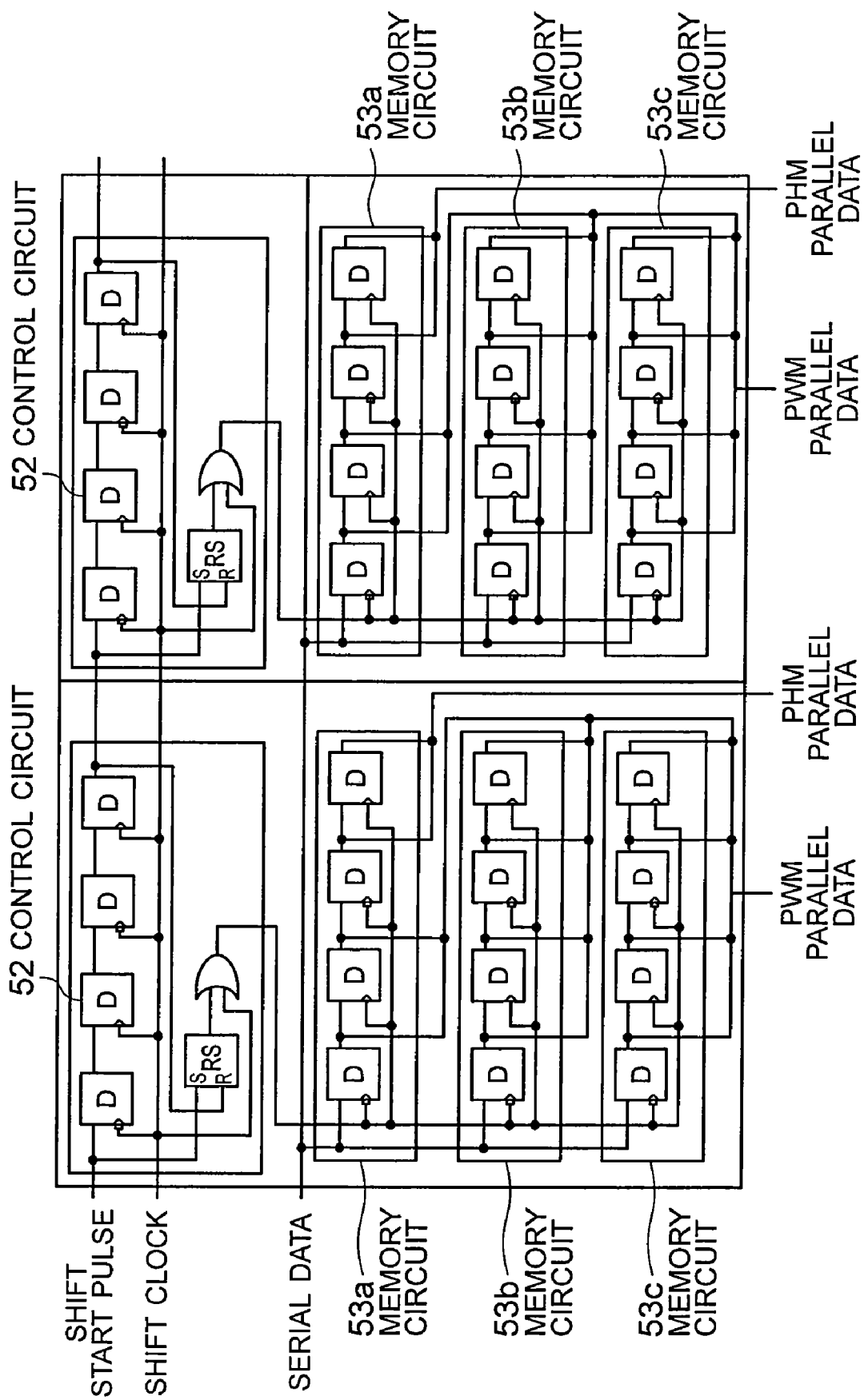
FIG. 11 is the block diagram of a shift register in the modulation circuit of the driving circuit in accordance with the second embodiment of this invention.

Next, the shift register 9 provided in the modulation circuit 2 in accordance with this second embodiment will be described. In FIG. 11 is shown the internal construction of the shift register 9 in accordance with this second embodiment.

As shown in FIG. 11, the PHM serial data and the PWM serial data, which are serially converted by the parallel/serial conversion circuit 6, are inputted to the shift register 9 in accordance with this second embodiment. Moreover, the PHM parallel data and the PWM parallel data, which are modulation data related to the wirings in the direction of row of the multi-electron source 1, are outputted from the shift register 9. As shown in FIG. 10, data used for generating a modulating signal for modulating one display element for a predetermined selection period is inputted as the parallel data of the parallel number 12 to the parallel/serial conversion circuit 6, thereby being serially converted to a format in which the parallel number is 3 and in which the number of bits in the direction of time series is 4. That is, signals of three systems (parallel number is 3) are inputted as the serial data to the shift register 9 shown in FIG. 11.

The PHM parallel data and the PWM parallel data as modulation data, which are outputted from the shift register 9, are supplied to the PWM circuit 10. This PWM circuit 10 is a circuit for generating outputs responsive to the respective output voltages in the output stage circuit 11. Moreover, timing signals for controlling the shift register 9 and the PWM circuit 10 are supplied from the timing generating circuit 4.

Moreover, as shown in FIG. 11, the shift register 9 in accordance with this second embodiment is constructed to include a plurality of control circuits 52 and a plurality of memory circuits 53. Here, in this second embodiment, a case where the control circuits 52 and the memory circuit 53 are constructed of D flip-flop circuits, a RS flip-flop circuit, and an OR gate circuit will be described by way of example, but they are not necessarily limited to this circuit construction.

Each of the memory circuit 53a, the memory circuit 53b, and the memory circuit 53c constructs a circuit for converting the serialized data of three systems to parallel data. Serial data of two systems in which the PHM data and the PWM data are not mixed is inputted to each of the memory circuit 53b and the memory circuit 53c. The serial data is transferred by a flip flop of a memory element and is outputted as parallel data at a predetermined timing. Data in which the PHM data and the PWM data are serially mixed with each other, in particular, out of the serial data including the PHM data and the PWM data serially converted across the board by the parallel/serial conversion circuit 6 is inputted to the memory circuit 53a. In the memory circuit 53a, four flip flops of memory elements are connected in series. Each of the flip flops stores an inputted data bit and inputs the stored data bit to the flip flop of the next stage. Serial data of 4 bits is held by these four flip flops. The data of 2 bits out of them is outputted as PHM data and the other data of 2 bits is outputted as PWM data. The PWM data of 2 bits outputted by the memory circuit 53a, the PWM data of 4 bits outputted by the memory circuit 53b, and the PWM data of 4 bits outputted by the memory circuit 53c become data for constructing the PWM parallel data of 10 bits. With this, the PHM parallel data and the PWM parallel data that are modulation data related to the wirings in the direction of row of the multi-electron source 1 are outputted to the PWM circuit 10.

Moreover, the control circuit 52 is provided with a shift start pulse and a shift clock, which are one of timing signals generated by the timing generating circuit 4. This control circuit 52 is a circuit for generating a control signal for recording the PHM serial data and the PWM serial data, which are modulation data according to the wirings in the direction of row of the multi-electron source 1, across the board in the memory circuit 53. Here, the shift start pulse is a clock formed by a differential shift clock that is one of timing signals generated by the timing generating circuit 4. Then, a construction is employed in which the data is transferred at the timings of rising edge and falling edge of this clock.

Then, the serial data is recorded in the memory circuit 53 according to a recording control signal generated by the control circuit 52. The output data outputted from the memory circuit 53 is constructed in parallel. This output data is supplied to the PWM circuit 10 in a collective manner according to the wirings in the direction of row of the multi-electron source 1.

The driving circuit of the display element in accordance with this second embodiment is constructed in this manner.

According to the driving circuit of the image display apparatus in accordance with this second embodiment, it is possible to produce the same effect as the first embodiment and to transmit the data of two attributes which uses amplitude modulation and pulse width modulation in combination without greatly increasing the number of transmission lines also in the construction. In particular, in this second embodiment, the modulation circuit is constructed to include the memory circuit capable of outputting height value data and timing data separately and hence it is possible to serialize the height value data and the timing data in mixture. With this, it is possible to eliminate the need for providing dummy data or to decrease the number of necessary dummy data.

While the preferred embodiments of this invention have been specifically described, this invention is not limited to the above embodiments but this invention can be further variously modified within the technical spirit and scope of this invention.

For example, the construction of the PWM circuit, the shift register, the output stage circuit, the PHM data, and the PWM data, which have been described in the above embodiments, are strictly for purpose of example and other constructions other than this can be employed if required.

As described above, according to this invention, by serializing the height value data bits and the pulse width data bits which determine the modulating signal whose height value and pulse width are modulated, it is possible to decrease the number of transmission paths and transmission lines. Therefore, it is possible to prevent the data lines for transmitting data from increasing in number even if the number of gradation increases.

This application claims priority from Japanese Patent Application No. 2004-193928 filed Jun. 30, 2004, and Japanese Patent Application No. 2005-175118 filed Jun. 15, 2005, which are hereby incorporated by reference herein.

What is claimed is:

1. A driving circuit for display elements, the driving circuit comprising:
    a modulation circuit that outputs a modulating signal to be applied to wiring to which display elements are connected; and
    an output circuit that (a) converts inputted modulation data in parallel data format, including (i) height value data for determining a height value of at least part of a waveform of the modulating signal and (ii) pulse width data for determining a pulse width of at least part of a waveform of the modulating signal into data in serial data format, in order to allow transmission of the inputted modulation data through at least one transmission path, the number of which is smaller than the number of bits of the inputted modulation data, and (b) outputs the converted data in serial data format to the modulation circuit through the at least one transmission path.
    wherein the modulation circuit comprises a shift register that converts the converted data in serial data format into the height value data and pulse width data in parallel data format, and
    wherein the modulation circuit generates the modulating signal from the height value data and pulse width data in parallel data format.

2. A driving circuit according to claim 1, wherein the at least one transmission path includes at least a transmission path for transmitting both of (i) at least part of data bits constructing the height value data and (ii) at least part of data bits constructing the pulse width data, and
    wherein the shift register includes:
    (a) a memory circuit for storing data bits transmitted via the transmission path; and
    (b) a control circuit that reads and outputs data bit constructing the height value data from the memory circuit as height value data and reads and outputs data bit constructing the pulse width data from the memory circuit as pulse width data.

3. A driving circuit according to claim 2, wherein the memory circuit has a plurality of memory elements each storing a data bit to be inputted, wherein the plurality of memory elements are connected in series, wherein each memory element is constructed in such a way as to output the stored data bit to the next memory element connected in series in synchronization with a new data bit being inputted and to store the newly inputted data bit, and wherein part of the plurality of memory elements connected in series outputs the data bit constructing the height value data, and other part of the plurality of memory elements outputs the data bit constructing the pulse width data.

4. A driving circuit according to claim 1, wherein the height value data is data for determining a height value of a portion where the modulating signal becomes a maximum height value.

5. A driving circuit according to claim 1, wherein the pulse width data is data for determining timing when the modulating signal falls.

6. A driving circuit according to claim 1, wherein the inputted modulation data is 10 bit data, wherein the at least one transmission path comprises three transmission paths, and wherein the output circuit converts the 10 bit data into 12 bit data, which 12 bit data is output by serially outputting four bits of the 12 bit data on a first of the three transmission paths, another four bits of the 12 bit data on a second of the three transmission paths, and another four bits of the 12 bit data on a third of the three transmission paths.

7. An image display apparatus comprising:
the driving circuit according to claim 1; and
a display device for displaying an image according to a modulating signal outputted from the driving circuit.

8. A television apparatus comprising:
the image display apparatus according to claim 7; and
a tuner that receives a television signal and supplies image data to the image display apparatus.

* * * * *